United States Patent Office 3,462,007
Patented Aug. 19, 1969

3,462,007
QUILTED PLASTIC PACKING MATERIAL AND
METHOD OF FORMING
James E. Heider and Roger R. Rhoads, Toledo, Ohio, assignors to Owens-Illinois, Inc., a corporation of Ohio
Filed Oct. 25, 1967, Ser. No. 678,033
Int. Cl. B65d *85/00;* B32b *31/06, 27/14*
U.S. Cl. 206—46                                    10 Claims

ABSTRACT OF THE DISCLOSURE

A quilted cushioning unit comprising a plurality of connected, but physically isolated envelopes, each of said envelopes loosely enclosing a plurality of resilient beads.

---

This invention relates to quilted sheet material and methods of making such material. More particularly, this invention pertains to a quilted cushioning unit, useful in packaging, which unit includes a loose mass of resilient beads enclosed in a flexible bag.

In packaging fragile items such as electronic components and glassware, shock absorbing media is often employed to cushion the item against impact. Commonly used cushioning materials include loose material such as excelsior and vermiculite; and sheet material in the form of blankets or pads. Loose cushioning material is an effective shock absorbing medium, but is often difficult to handle when the product is unpackaged, while blankets and pads are often bulky and inefficient in cushioning irregularly shaped articles.

Other cushioning media include molded pads such as polystyrene pads in the form of the article to be packaged. For example, corner pads for furniture shipping boxes have been molded from foam polystyrene. These molded pads are effective but relatively expensive due to the mold cost, cost of the processing and the machinery itself required for their manufacture.

Accordingly it is an object of the present invention to provide novel low cost packaging material and method of making such packing material.

Another object is to provide a method of producing a shock absorbing media comprising loosely encased resilient beads in a film envelope.

A further object is to provide a method of manufacturing a conformable inner packaging media with good shock absorbing properties.

Yet another object is to provide for the loose encasement of pre-expanded polystyrene beads in a plastic film bag for use as a comformable shock absorbent packing material.

The above and other objects, features and advantages of the present invention will become apparent from the following description and drawings wherein:

FIG. 3 is an enlarged perspective view of the cushioning material shown in FIGS. 1 and 2.

Figure 1:
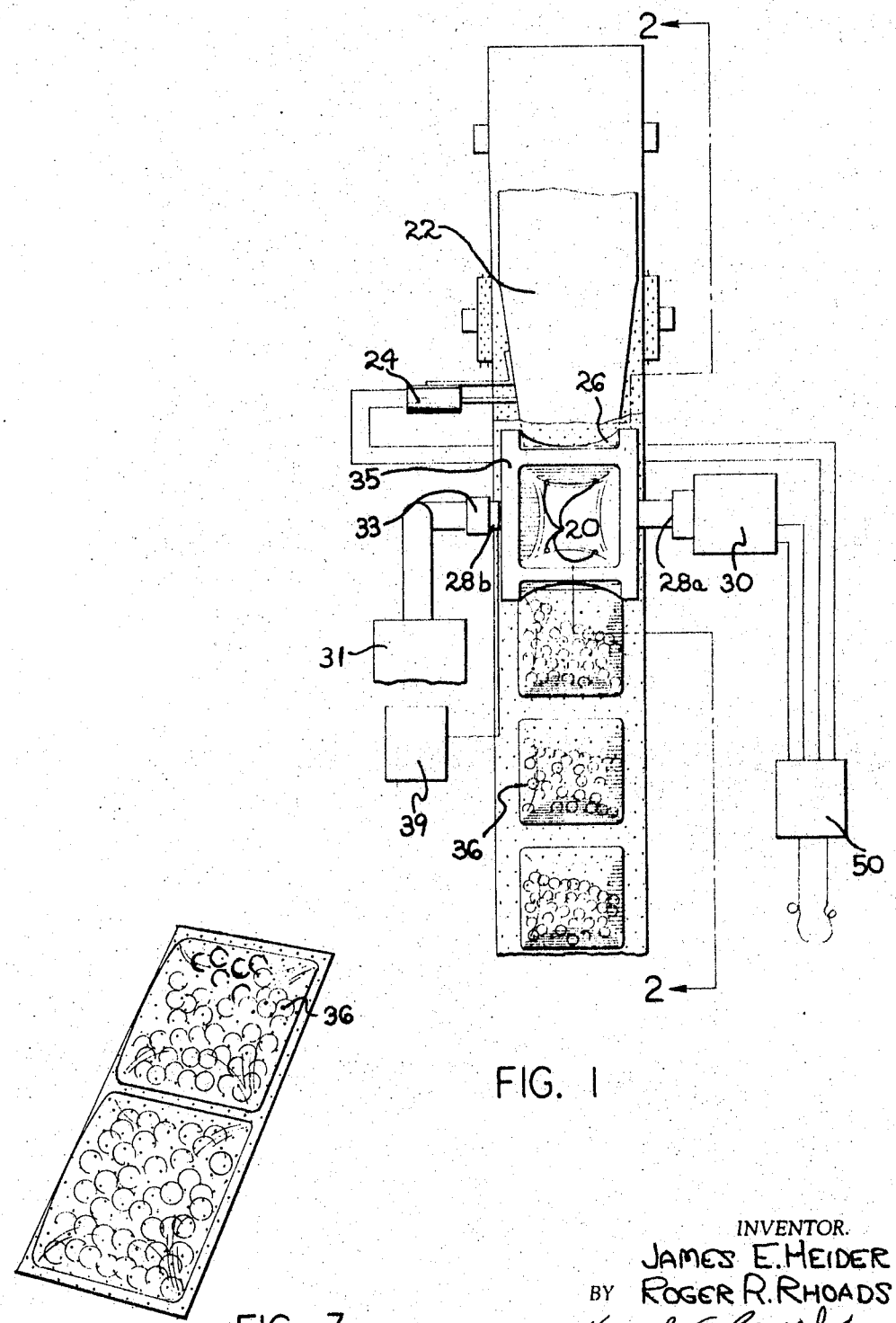
FIG. 1 is a schematic view of one form of apparatus that can be used in practicing the present invention.
Figure 2:
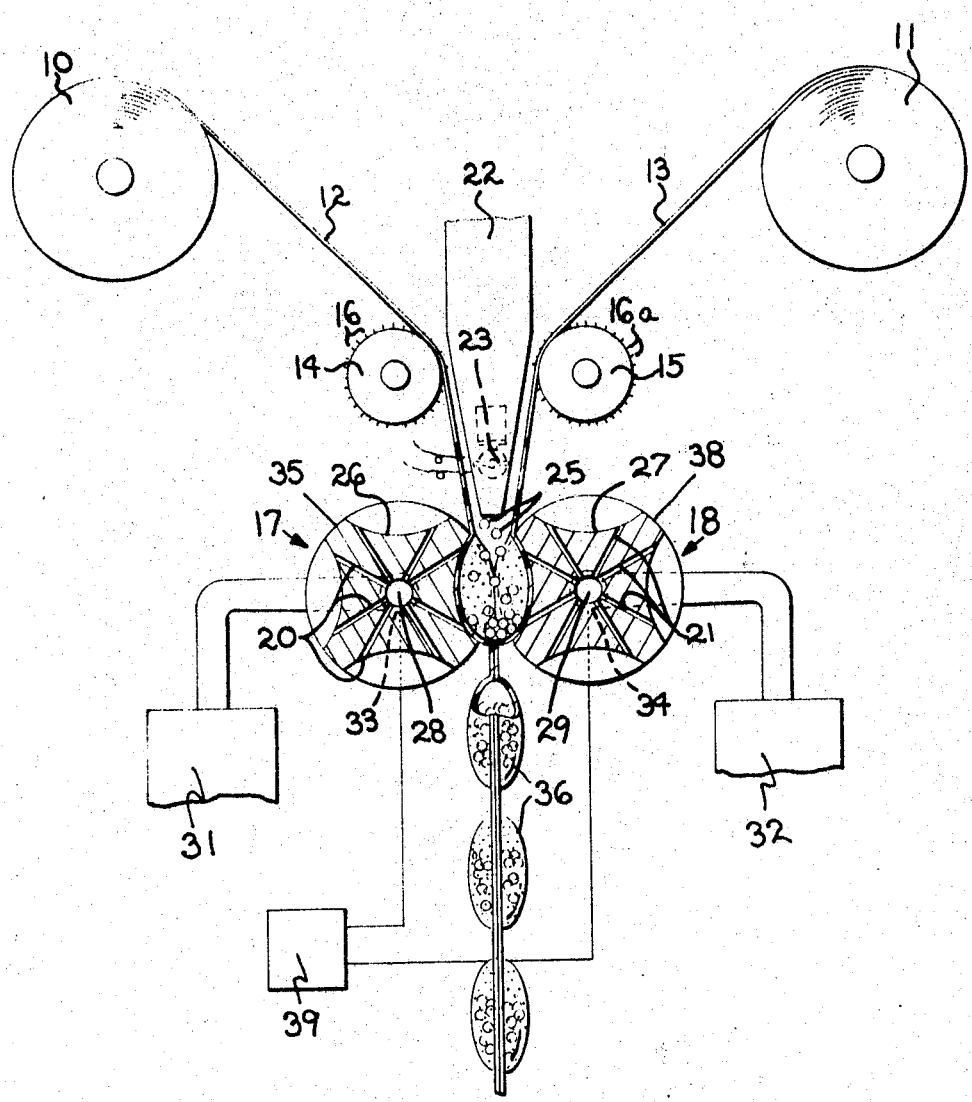
FIG. 2 is a sectional view of the apparatus of FIG. 1 taken along lines 2—2.

Referring now to the drawings, and more particularly to FIGS. 1 and 2, there is illustrated a pair of juxtapositioned, electrically heated, molding or embossing rollers 17 and 18 which are mounted on hollow drive shafts 28 and 29 respectively. Rollers 17 and 18 are provided with recessed surface patterns or pockets 26 and 27 for producing a plurality of discrete cells or cavities. The recessed patterns or pockets 26 and 27 on each roller are identical and the patterns are in symmetrical registry as shown in FIG. 2.

Also shown in FIG. 1, is the shaft end 28a of shaft 28 which is geared to motor 30 so that shaft 28 is driven clockwise as shown in FIG. 2. The end of shaft 29 is similarly geared to motor 30 so that shaft 29 is driven counterclockwise as shown in FIG. 2. The opposite ends 28b and 29b, of shafts 28 and 29, are connected to vacuum sources 31 and 32 by means of rotary seals 33 and 34. Radially extending from and communicating with the interior of hollow shafts 28 and 29, within molding or embossing rolls 17 and 18, are a plurality of vacuum lines 20 and 21 which communicates with the recessed surface patterns 26 and 27 along the periphery of the molding rolls.

As illustrated in the drawings, a pair of puncture rolls 14 and 15 are rotatably mounted above molding rolls 17 and 18. The peripheries of puncture rolls 14 and 15 are provided with a plurality of radially extending pins or spikes 16 and 16a which serve to perforate each sheet as it passes thereover. Between the puncture rolls 14 and 15 there is mounted a hopper 22 containing particulate material such as beads 25 of suitable resilient material such as expanded polystyrene, vinyl, foam rubber, ABS or the like. Bead hopper 22 is equipped with a dispensing valve 23 which is actuated by a suitable valve control device 24 to periodically dispense the beads at appropriate stages of the envelope forming cycle. The motor 30 and valve control device 24 are electrically energized through panel 50 so that synchronization between the rotation of the embossing rolls and the dispensing valve is realized.

On either side of bead hopper 22 are rotatably positioned supply rolls 10 and 11 of suitable plastic sheet material 12 and 13. While any suitable plastic film can be utilized, excellent results are attained with polyolefin films including polyethylene and polypropylene; polyvinyl chloride and its copolymers with polyvinyl acetate, polyvinylidene chloride, polyvinyl butyral, polystyrene; and cellulose acetate, as well as films of thermosetting resins having a thermoplastic stage.

In practicing the present invention, the sheets or films 12 and 13 are guided over puncture rolls 14 and 15 where the sheets are perforated. The perforated sheets 12 and 13 are then directed into contact with molding rolls 17 and 18 where the sheets 12 and 13 are immediately vacuum drawn into contact with the molding surfaces including the recessed patterns 26 and 27. The ribs or non-recessed surfaces 35 and 38 of molding rolls 17 and 18 are heated by suitable means such as an electrical resistance heating apparatus 39 illustrted in the drawing. In the form of the invention illustrated, the sheets are fused together by conduction of heat from the heated rolls at spaced intervals and by pressure applied at these intervals or at the points of fusion.

The ribs 35 and 38 are heated resistively by suitable electrical apparatus 39. These resistively heated ribs transfer heat to the compressed sheets so as to bring about fusion between the sheets 12 and 13 along the lines of registration of the ribs 35 and 38. It is to be understood that the designs formed by the ribs on the molding rollers must be identical and must register in order to transmit the required heat through the compressed lamination, so that the contacting sheets 12 and 13 are fused together. As the molding rollers rotate, then, that portion of sheets 12 and 13, contacting ribs 35 are superposed and thermally compression fused together along the lines defined by the ribs so as to define a perforated, pillow-shaped envelope 36. As the molding rolls rotate, a series of such envelopes is formed as shown in FIG. 2.

The valve control device 24 operates in synchronization with the rotation of forming rolls to dispense a predetermined charge of beads (usually about ⅓ to ½ of the envelope volume) in the perforated envelope 36 as the envelope is being formed. The control valve device periodically opens and closes the valve 23 so beads will not be trapped in the seal formed between coacting axial ribs on the forming rolls. The valve control device 24 and the motor 30 are shown diagrammatically.

The perforations in the envelope (which are of course smaller than the beads) permit the enclosed air to escape and the cushioning unit is readily comformable to the surface to be protected.

While a single vertical row of pillow-shaped compartments are shown in the drawings and described above, it is to be understood that the embossing rolls and the bead hopper can be modified to produce a continuous array of such compartments integrally joined together in the horizontal as well as vertical directions.

We claim:

1. An article of manufacture suitable for use as a packing material comprising
   a quilted, laminated, shock absorbent blanket, said blanket comprising a plurality of connected cushioning units, each of said units comprising a perforated, plastic film envelope, said envelope enclosing a loose mass of resilient particulate material.

2. The article of claim 1 wherein said resilient particulate material is in the form of beads.

3. The article of claim 2 wherein said plastic film envelope is a polyolefin film envelope.

4. The article of claim 3 wherein said polyolefin film envelope is a polyethylene film envelope.

5. The article of claim 4 wherein said particulate material comprises expanded polystyrene beads.

6. A method for forming a quilted, laminated, shock absorbent material comprising the steps of
   superposing a pair of perforated thermoplastic films between a pair of embossing rolls, said embossing rolls cooperating to define a plurality of isolated cavities therebetween,
   evacuating air from said cavities whereby said films are drawn in conformity with said cavities,
   dispensing a predetermined amount of resilient particulate material between said films and into said cavities, said particulate material having a larger particle diameter than the film perforations, and
   sealing the films together in overlying relationship between said cavities to form a plurality of integral, isolated compartments.

7. The method of claim 6 wherein the films are sealed together through the application of heat and pressure along the cavity peripheries.

8. The method of claim 7, wherein said resilient particulate material is in the form of beads.

9. The method of claim 7 wherein said thermoplastic films comprise thin films of polyethylene.

10. The method of claim 9 wherein said particulate material comprises expanded polystyrene beads.

References Cited

UNITED STATES PATENTS

| 3,011,930 | 12/1961 | Dworak | 206—46 |
| 3,228,167 | 1/1966 | Schmidt | 206—46 |
| 3,304,219 | 2/1967 | Nickerson | 206—46 |

JAMES B. MARBERT, Primary Examiner

U.S. Cl. X.R.
156—276; 161—182